US007762227B2

(12) United States Patent
Sadowski et al.

(10) Patent No.: US 7,762,227 B2
(45) Date of Patent: Jul. 27, 2010

(54) COOLABLE PISTON FOR INTERNAL COMBUSTION ENGINE

(75) Inventors: Michael S. Sadowski, Elmhurst, IL (US); Michael L. Mickelson, Gurnee, IL (US)

(73) Assignee: Federal Mogul Corporation, Southfield, MI (US)

( * ) Notice: Subject to any disclaimer, the term of this patent is extended or adjusted under 35 U.S.C. 154(b) by 339 days.

(21) Appl. No.: 12/033,097

(22) Filed: Feb. 19, 2008

(65) Prior Publication Data

US 2009/0205604 A1 Aug. 20, 2009

(51) Int. Cl.
*F16J 1/14* (2006.01)

(52) U.S. Cl. .................................................. 123/193.6

(58) Field of Classification Search .............. 123/193.6, 123/41.35; 92/186; 29/888.04

See application file for complete search history.

(56) References Cited

U.S. PATENT DOCUMENTS

| | | | |
|---|---|---|---|
| 1,900,521 | A | 3/1933 | Price |
| 2,687,931 | A | 8/1954 | Flynn, Jr. |
| 2,698,210 | A | 12/1954 | Baller |
| 3,221,718 | A | 12/1965 | Isley |
| 3,336,844 | A | 8/1967 | Cornet |
| 3,413,897 | A | 12/1968 | Atkin |
| 3,805,677 | A | 4/1974 | Clary et al. |
| 3,906,924 | A | 9/1975 | Elsbett |
| 4,377,967 | A | 3/1983 | Pelizzoni |
| 4,505,233 | A | 3/1985 | Kanda et al. |
| 4,506,632 | A | 3/1985 | Kanda et al. |
| 4,577,595 | A | 3/1986 | Deutschmann et al. |
| 4,843,698 | A | 7/1989 | Ripberger et al. |
| 4,986,167 | A | 1/1991 | Stratton et al. |
| 5,052,280 | A | 10/1991 | Kopf et al. |
| 5,144,923 | A | 9/1992 | Leites et al. |
| 5,261,363 | A | 11/1993 | Kemnitz |
| 5,357,920 | A | 10/1994 | Kemnitz et al. |
| 5,546,896 | A | 8/1996 | Zaiser |

(Continued)

*Primary Examiner*—M. McMahon
(74) *Attorney, Agent, or Firm*—Robert L. Stearns; Dickinson Wright, PLLC

(57) ABSTRACT

A coolable piston for internal combustion engines is disclosed herein. The coolable piston includes a head portion with a crown and an annular wall. First and second shoulders are defined in annular wall adjacent to one another. A collar is formed on a distal end of the annular wall and flanged over to project radially inwardly from the distal end. An annular rib extends from the crown and within the annular wall to thereby define an annular cavity with the annular wall. The annular cavity extends along the longitudinal axis from a first end closed by the crown to a second end at the distal end of the annular wall. The coolable piston also includes first and second pin bosses disposed at a distal end of the annular rib. The coolable piston also includes an annular notch formed in the annular rib and substantially opposing the first shoulder. The coolable piston also includes a ring member closing the second end of the annular cavity. The ring member is releasably engaged with both of the annular rib and the annular wall for servicing. The ring member has an inner periphery supported against movement along the longitudinal axis by the annular notch. The ring member has an outer periphery disposed between the first shoulder and the second shoulder. The coolable piston also includes a locking ring disposed in the collar against the second shoulder and supporting the outer periphery of the ring member against axial movement.

3 Claims, 4 Drawing Sheets

U.S. PATENT DOCUMENTS

| | | | | |
|---|---|---|---|---|
| 5,778,533 | A | 7/1998 | Kemnitz | |
| 5,778,846 | A * | 7/1998 | Mielke | 123/193.6 |
| 6,453,797 | B1 | 9/2002 | Bauer | |
| 6,487,773 | B1 | 12/2002 | Scharp et al. | |
| 6,647,861 | B1 | 11/2003 | Jacobi et al. | |
| 6,659,062 | B1 | 12/2003 | Issler | |
| 6,701,875 | B2 | 3/2004 | Weng et al. | |
| 6,722,263 | B2 | 4/2004 | Keller et al. | |
| 6,772,846 | B1 | 8/2004 | Scharp | |
| 6,820,582 | B1 | 11/2004 | Gabriel et al. | |
| 6,892,690 | B2 | 5/2005 | Gabriel et al. | |
| 6,920,860 | B2 | 7/2005 | Gabriel et al. | |
| 6,938,604 | B2 | 9/2005 | Gabriel et al. | |
| 6,957,638 | B2 * | 10/2005 | Scharp | 123/193.6 |
| 7,131,418 | B2 | 11/2006 | Wieland | |
| 7,162,990 | B1 | 1/2007 | Ioja et al. | |
| 7,415,959 | B2 * | 8/2008 | Scharp | 123/193.6 |

* cited by examiner

COOLABLE PISTON FOR INTERNAL COMBUSTION ENGINE

BACKGROUND OF THE INVENTION

1. Field of the Invention

The present invention relates to a coolable piston for internal combustion engines.

2. Description of Related Prior Art

A piston assembly for an internal combustion engine generally becomes very hot during operation. Also, the piston is subjected to relatively severe thermal stresses relative to other engine parts. For example, the crown of the piston is directly exposed to the most extreme heat of the gases in the combustion chamber. The challenges posed by extreme heating of the crown has become more severe with modern internal combustion engines due to increases in the thermal load on the parts resulting from increases in engine power output. Various schemes have been developed in the past for aiding with the cooling of such a piston assembly; some form of active cooling for the piston assembly is often necessary. For example, a flow of lubricant can be directed to the underside of the crown from the crank chamber. It has been recognized as desirable in some arrangements to provide a member near the lower surface of said piston crown to define a lubricant reservoir for temporarily and intermittently accumulating a pool of lubricant. The lubricant from this pool can be splashed against the piston crown as the piston reciprocates in the cylinder bore. Such a lubricant reservoir may be defined by a part of the piston assembly which is integrally formed or cast with the piston main body itself or is welded thereto.

SUMMARY OF THE INVENTION

In summary, the invention is a coolable piston for internal combustion engines. The coolable piston includes a head portion with a crown and an annular wall. First and second shoulders are defined in annular wall adjacent to one another. A collar is formed on a distal end of the annular wall and flanged over to project radially inwardly from the distal end. An annular rib extends from the crown and within the annular wall to thereby define an annular cavity with the annular wall. The annular cavity extends along the longitudinal axis from a first end closed by the crown to a second end at the distal end of the annular wall. The coolable piston also includes first and second pin bosses disposed at a distal end of the annular rib. The coolable piston also includes an annular notch formed in the annular rib and substantially opposing the first shoulder. The coolable piston also includes a ring member closing the second end of the annular cavity. The ring member is releasably engaged with both of the annular rib and the annular wall for servicing. The ring member has an inner periphery supported against movement along the longitudinal axis by the annular notch. The ring member has an outer periphery disposed between the first shoulder and the second shoulder. The coolable piston also includes a locking ring disposed in the collar against the second shoulder and supporting the outer periphery of the ring member against axial movement.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENT

Figure 1:
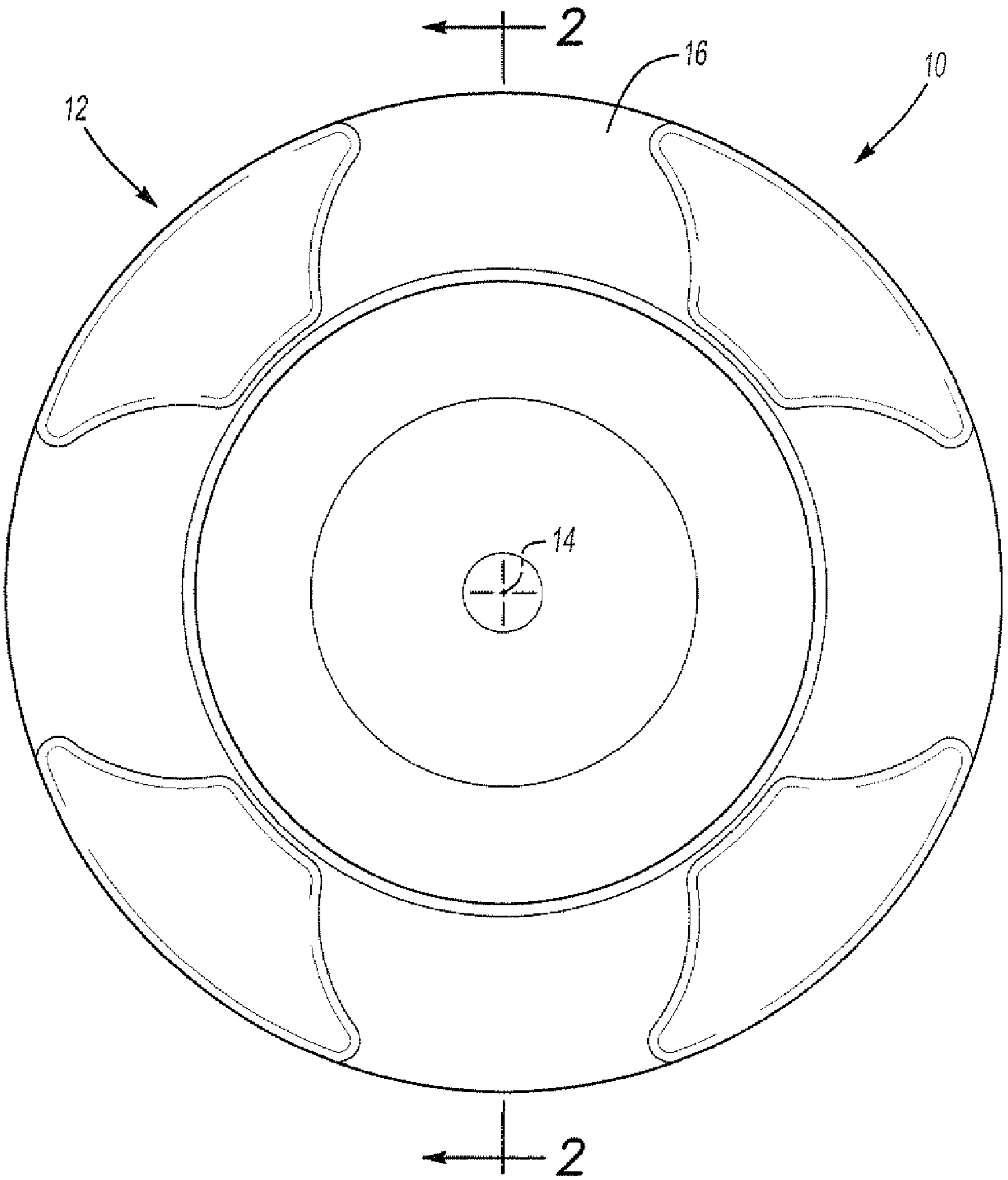
FIG. 1 is a top view of a coolable piston according to a first exemplary embodiment of the invention.
Figure 2:
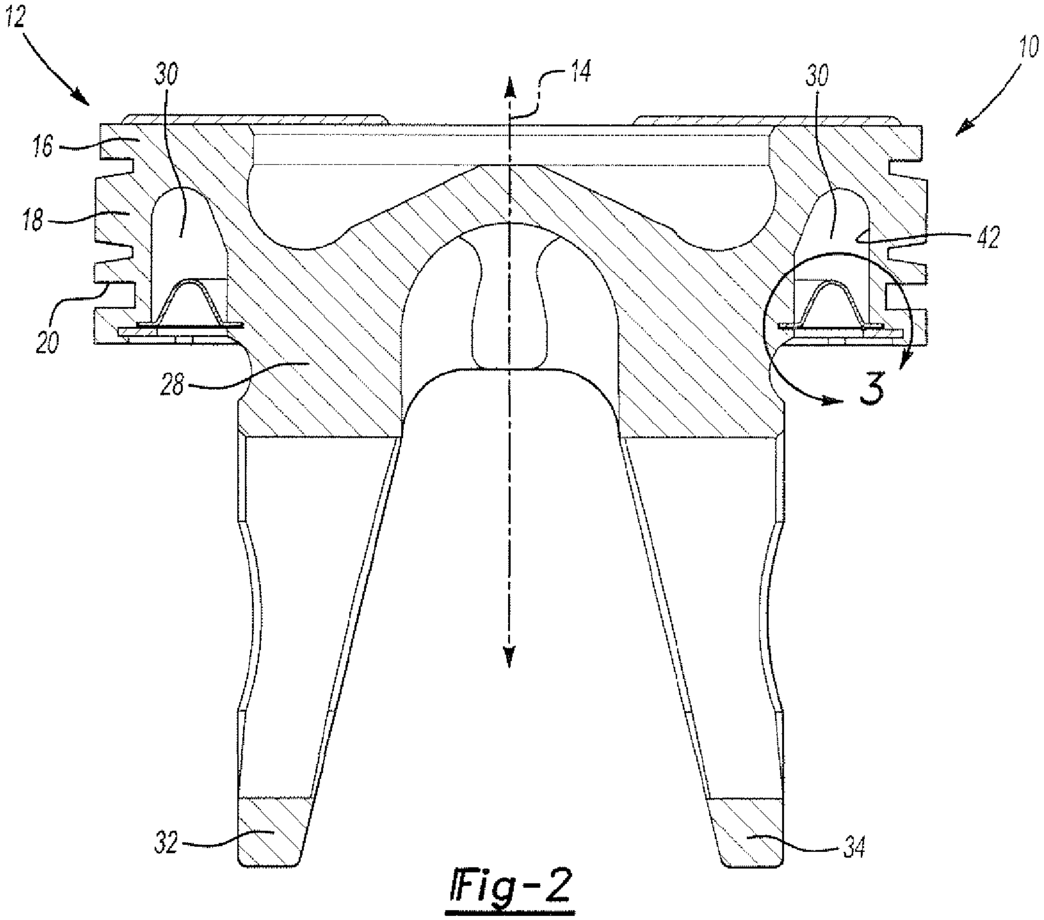
FIG. 2 is a cross-sectional view of the first exemplary embodiment taken along section lines 2-2 in FIG. 1.
Figure 3:
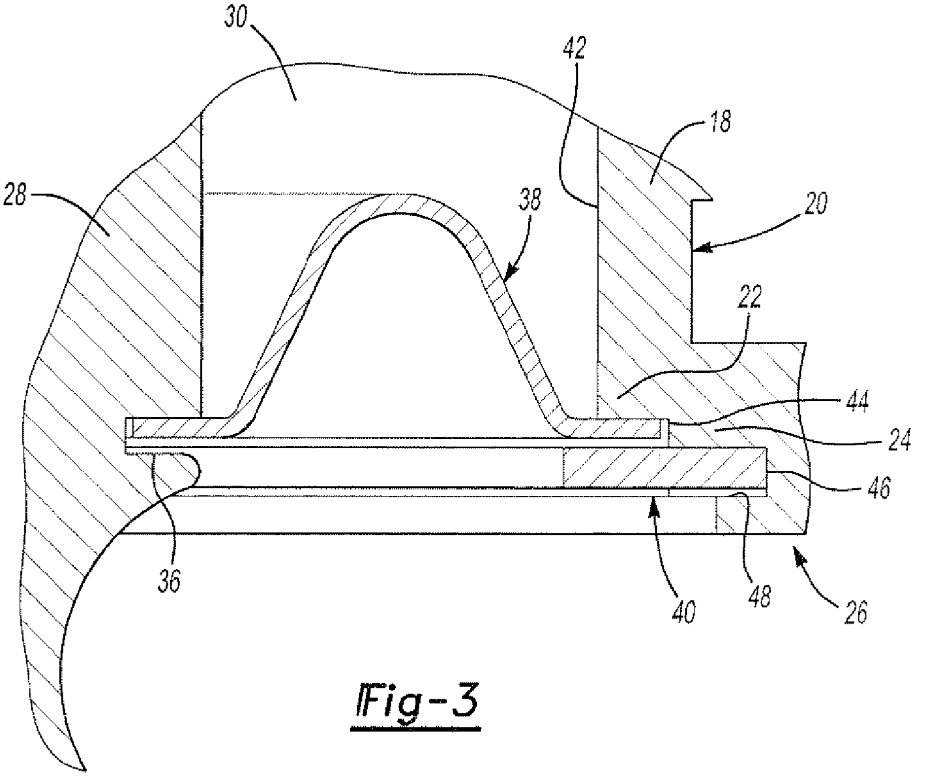
FIG. 3 is a detail view of the cross-section from FIG. 2, taken along the section line 3.

A plurality of different embodiments of the invention are shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if the a particular feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIGS. 1-4, a coolable piston for an internal combustion engine is shown at 10. The piston 10 includes a head portion 12 extending along a longitudinal axis 14 with a crown 16 and an annular wall 18. The annular wall 18 extends away from the crown 16 along the longitudinal axis 14. The annular wall 18 is unitary and integrally-formed with respect to the crown 16 and defines at least one ring groove 20 for receiving a piston ring. The head portion 12 can be formed from any material appropriate for the intended operating environment.

A first shoulder 22 is formed in the annular wall 18. The annular wall 18 includes an inner surface having a plurality of different diameters. A first portion 42 of the inner surface of the annular wall 18 defines a first inner diameter. A second portion 44 of the inner surface of the annular wall 18 defines a second inner diameter. The first inner diameter is less than the second inner diameter. The first shoulder 22 is defined between the first and second portions 42, 44 of the annular wall 18.

A second shoulder 24 is also formed in the annular wall 18. A third portion 46 of the inner surface of the annular wall 18 defines a third inner diameter. The second inner diameter is less than the third inner diameter. The second shoulder 24 is defined between the second and third portions 44, 46 of the annular wall 18. The second shoulder 24 in the annular wall 18 is adjacent to the first shoulder 22 along the longitudinal axis 14.

A collar 26 is formed on a distal end of the annular wall 18. The collar 26 flanges over to project radially inwardly from the distal end toward the axis 14. The collar 26 thus forms an annular notch 48 facing radially-inward.

The piston 10 also includes an annular rib 28 extending from the crown 16. The annular rib 28 extends within the annular wall 18 and thereby defines an annular cavity 30 with the annular wall 18. The annular cavity 30 extends along the longitudinal axis 14 front a first end closed by the crown 16 to a second end at the distal end of the annular wall 18.

The piston 10 also includes first and second pin bosses 32, 34 disposed at a distal end of the annular rib 28 spaced from the crown 16. The first and second pin bosses 32, 34 can receive a pin for connection to a connecting rod. The first and second pin bosses 32, 34 in the exemplary embodiment of the invention are unitary and integrally-formed with respect to the crown 16.

An annular notch 36 facing radially-outward is formed in the annular rib 28. The annular notch 36 substantially opposes the first shoulder 22 along the longitudinal axis 14. That the notch 36 is opposing the shoulder 22 is one example of how the broader invention can be practiced, and not the only way for practicing the invention.

A ring member 38 is positioned to close the second end of the annular cavity 30. The ring member 38 is releasably engaged with both of the annular rib 28 and the annular wall 18. The ring member 38 can be removed for servicing the piston 10. The ring member 38 has an inner periphery 50 supported against movement along the longitudinal axis 14 by being received in the annular notch 36. The ring member 38 also has an outer periphery 52 disposed between the first shoulder 22 and the second shoulder 24 along the longitudinal axis 14.

A locking ring 40 is disposed in the annular notch 48 of the collar 26. The locking ring 40 is disposed against the outer periphery 52, opposite the second shoulder 24. The locking ring 40 supports the outer periphery 52 of the ring member 38 against movement along the longitudinal axis 14.

Figure 4:
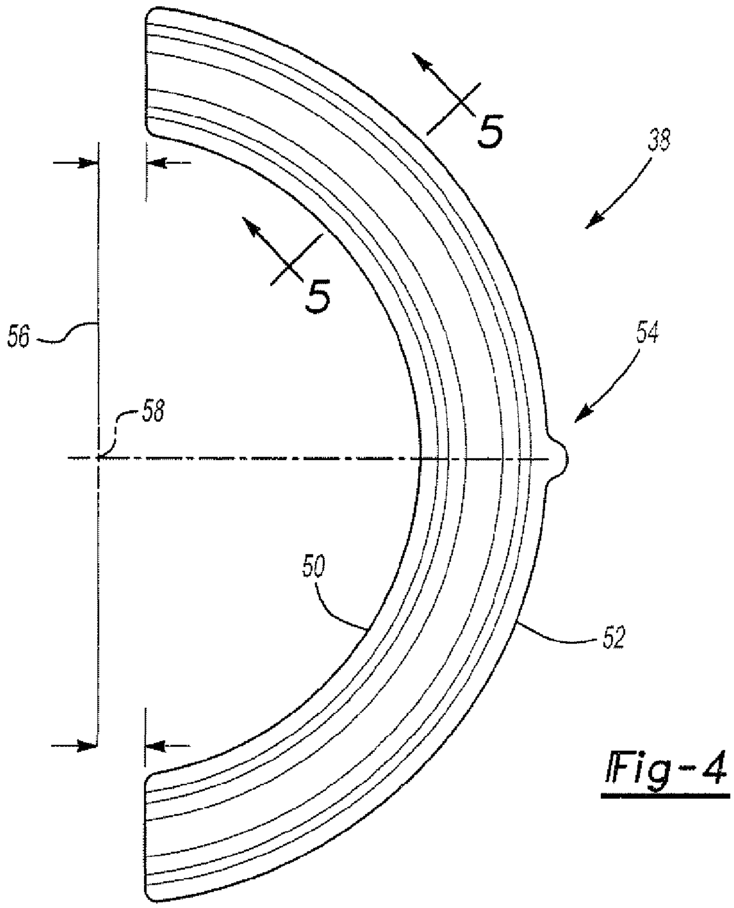
FIG. 4 is top view of a ring member incorporated in the first exemplary embodiment.

In the exemplary embodiment of the invention, the ring member 38 includes first and second half-ring members. FIG. 4 shows one of the half-ring members, designated as 54. A second half-ring member identical to the half-ring member 54 would be disposed to close the annular cavity 30 with the half-ring member 54. As best shown in FIG. 4, each of the first and second half-ring members extend less than 180 degrees. This structural aspect of the half-ring members is shown by the existence of respective gaps between the two ends of the half-ring member 54 and an axis 56 extending through a center 58 of the half-ring member 54. The gaps between the half-ring members can be desirable to provide inlet and outlet ports for cooling lubricant.

Figure 5:
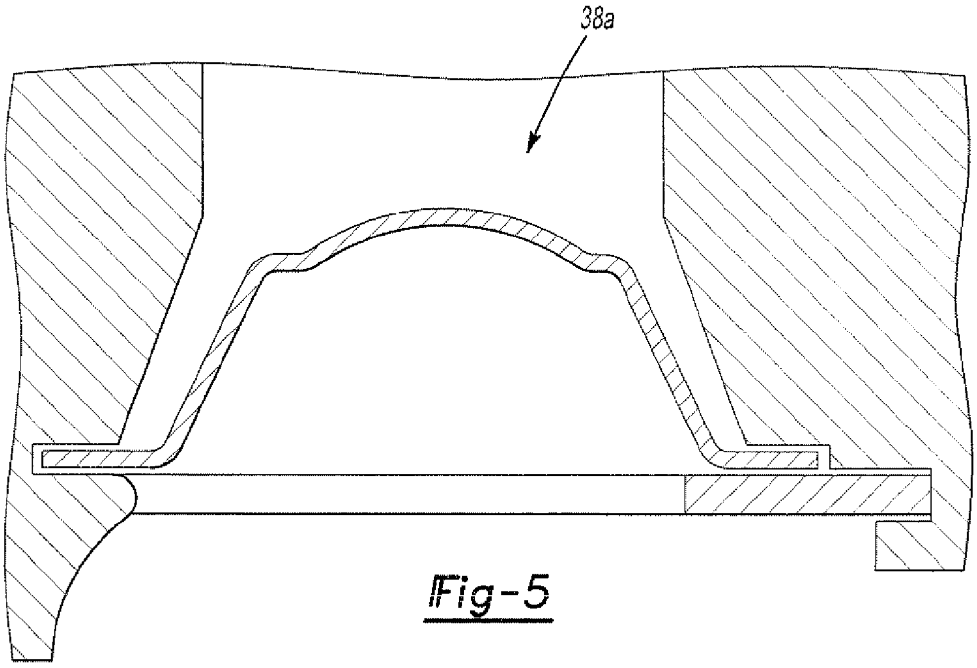
FIG. 5 is a detail view analogous to FIG. 3 but of a second exemplary embodiment of the invention.
Figure 6:
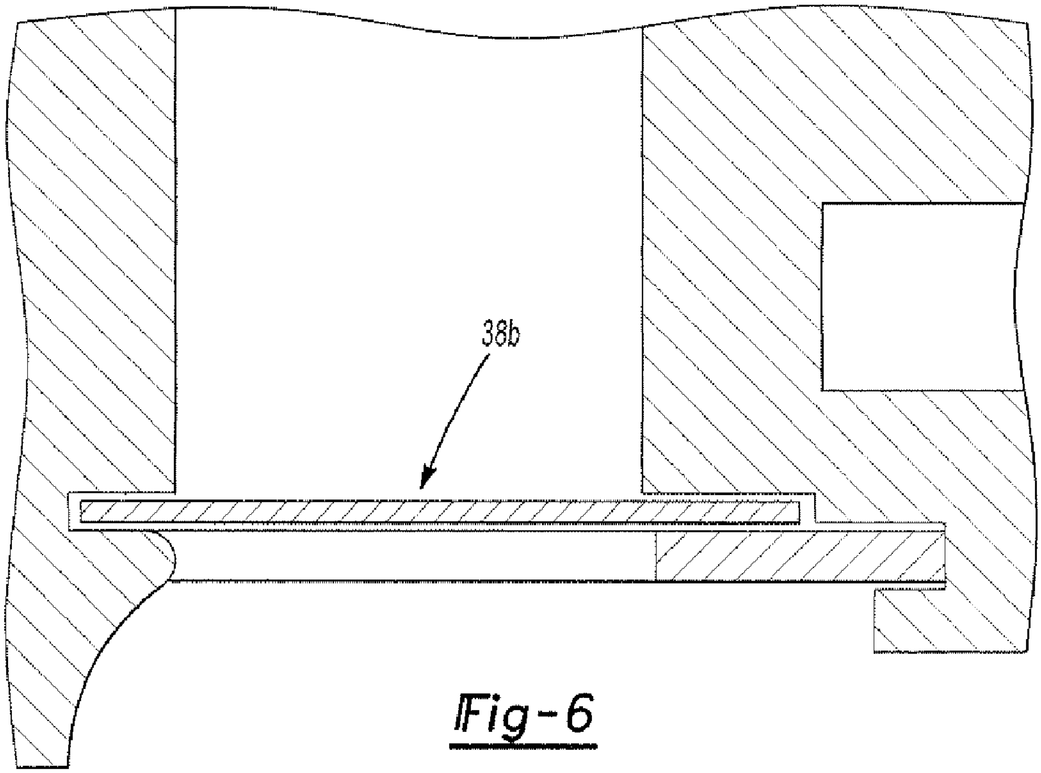
FIG. 6 is a detail view analogous to FIG. 3 but of a third exemplary embodiment of the invention.
Figure 7:
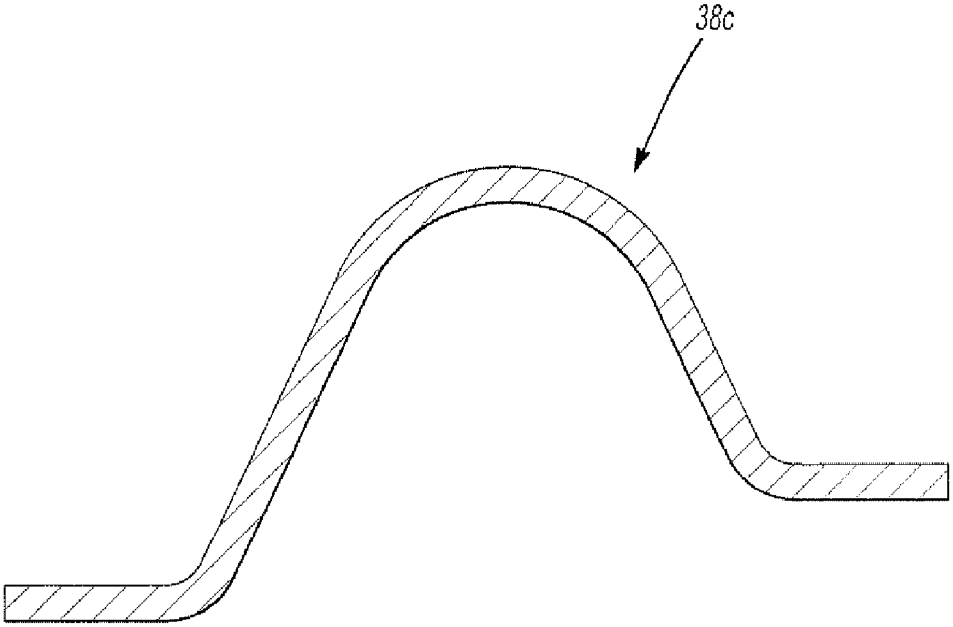
FIG. 7 is a detail view analogous to FIG. 3 but of a fourth exemplary embodiment of the invention.

FIGS. 1-4 show the ring member 38 having a first cross-section. FIGS. 5-7 are of second, third and fourth embodiments of the invention. In these embodiments, ring members 38*a*, 38*b*, 38*c* have different cross-sections. The ring member 38*c* have differently sized legs. The cross-section of the ring member in any particular embodiment can be selected based on the desired flow characteristics of the cooling lubricant in the annular cavity 30.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coolable piston for internal combustion engines comprising:

a head portion extending along a longitudinal axis with a crown and an annular wall extending away from said crown along said longitudinal axis, said annular wall unitary and integrally-formed with respect to said crown and defining at least one ring groove for receiving a piston ring;

a first shoulder in said annular wall defined between a first inner diameter of said annular wall and a second diameter of said annular wall;

a second shoulder in said annular wall adjacent to said first shoulder along said longitudinal axis and defined between said second inner diameter of said annular wall and a third diameter of said annular wall;

a collar formed on a distal end of said annular wall and flanged over to project radially inwardly from said distal end;

an annular rib extending from said crown and within said annular wall and thereby defining an annular cavity with said annular wall, said annular cavity extending along said longitudinal axis from a first end closed by said crown to a second end at said distal end of said annular wall;

first and second pin bosses disposed at a distal end of said annular rib spaced from said crown, said first and second pin bosses for receiving a pin for connecting rod;

an annular notch formed in said annular rib and substantially opposing said first shoulder along said longitudinal axis;

a ring member closing said second end of said annular cavity, said ring member releasably engaged with both of said annular rib and said annular wall for servicing, said ring member having an inner periphery supported against movement along said longitudinal axis by being received in said annular notch, said ring member having an outer periphery disposed between said first shoulder and said second shoulder along said longitudinal axis; and a locking ring disposed in said collar against said second shoulder and supporting said outer periphery of said ring member against movement along said longitudinal axis.

2. The coolable piston of claim 1 wherein said ring member includes first and second half-ring members.

3. The coolable piston of claim 2 wherein each of said first and second half-ring members extend less than 180 degrees.

* * * * *